United States Patent [19]

Abdiou et al.

[11] Patent Number: 5,493,762

[45] Date of Patent: Feb. 27, 1996

[54] MODULAR MACHINE TOOL FOR MACHINING BARS, COMPRISING A FRAME WITH FOUR TOOL SUPPORTING UNITS

[76] Inventors: Walter Abdiou, Maskrosg 12, Eksjo S-575 36; Sten Wallsten, Lillbjorka, Ormaryd, Nassjo D-571 92, both of Sweden

[21] Appl. No.: 923,793

[22] PCT Filed: Nov. 4, 1991

[86] PCT No.: PCT/SE91/00743

§ 371 Date: Aug. 27, 1992

§ 102(e) Date: Aug. 27, 1992

[87] PCT Pub. No.: WO92/07685

PCT Pub. Date: May 14, 1992

[30] Foreign Application Priority Data

Nov. 6, 1990 [SE] Sweden ................................ 9003525

[51] Int. Cl.⁶ .................................................... B23B 39/00
[52] U.S. Cl. ............................................ 29/26 A; 408/237
[58] Field of Search ................................ 29/26 A, 33 D, 29/563; 408/234, 53, 237; 409/134; 82/149

[56] References Cited

U.S. PATENT DOCUMENTS 1,540,809  6/1925  Sears .......................................... 409/134
2,390,254  12/1945  Henkle .
2,899,869  8/1959  Daugherty ........................... 408/234 X
3,008,381  11/1961  Jones ................................... 408/234 X

FOREIGN PATENT DOCUMENTS

86/02305  4/1986  WIPO .

*Primary Examiner*—Larry I. Schwartz
*Assistant Examiner*—Daniel Wittels
*Attorney, Agent, or Firm*—Cohen, Pontani Lieberman, Pavane

[57] ABSTRACT

The present invention is for a means for working of elongated objects. These objects can be profiles of wood, plastics or metal, e.g. extruded aluminium profiles. A means comprises sections for feeding in (1) profiles, working (2) and feeding out (4) the worked profiles. Additionally there may be between the working section and the feeding out section a device (3) for cutting of worked profiles to correct length. The means also comprises arrangements for linear movement of the profile through the different sections. A work station position within a working section comprises a frame or similar device which in itself comprises several, preferably four, working units, whereby each working unit may carry one or more working tools (22), e.g. cutting mill or drill, which during the working stages can move with at least three degrees of freedom.

10 Claims, 1 Drawing Sheet

MODULAR MACHINE TOOL FOR MACHINING BARS, COMPRISING A FRAME WITH FOUR TOOL SUPPORTING UNITS

BACKGROUND AND FIELD OF THE INVENTION

This invention relates to machines for the working of elongated objects. These elongated objects can be profiles made from wood, plastics or metal, i.e. extruded aluminum profiles. The means comprises sections for: feeding in profiles, working the profiles and then feeding out the worked profiles. Optionally, between the working section and the feeding out section a means for cutting worked profiles may be provided to alter the length of the profile. The means also comprises arrangements for linear movement of the profiles through the sections.

Working of wooden, plastic and metal profiles mainly includes threading, hole-making and making of slots and grooves. In certain applications the geometric shape of the holes, grooves and/or slots may vary or have unusual shapes, for example, when working hollow aluminum profiles for use as window frames or the like.

It is already known to work profiles in a machine which comprises sections for feeding in the profile, working it and feeding the worked profile out after the working operation is complete. This machine also comprises moving arrangements for the linear movement of the profile through the sections where working occurs. The profile to be worked is clamped by fastening means, so-called clamps, which grip the profile. In order to achieve sufficient stability of the profile during the working, it should be clamped on both sides of the working area. The working tools which are used to work the profile, i.e. milling cutter or drill, are mounted in motor driven spindles. During working, the tools move relative to the profile along the length axis of the tool. Where the particular hole is intended to also be elongated in, for example, the length direction of the profile, the profile is moved during working. This compound working operation is made possible when the clamps which hold the profile during the working are so-called roller clamps, i.e. the profile is clamped between rolls which can rotate around their own axes and thereby make it possible to move the profile during working while restraining the worked object in one or more directions. Where multiple working operations are desired, the working tools are positioned linearly or sequentially along the working section. Accordingly, where more than one operation must be accomplished on the profile, the working section can become undesirably long. It is therefore an object of the present invention to reduce the length of the work area required to work the elongated object.

Additionally, important factors in the working of profiles are speed and precision. Accordingly, it is a further object of the present invention to make possible the working of the object with greater precision and also with less time consumption. This is achieved by the apparatus of the present invention which allows for clamping the elongated object in close proximity to the working tool holders, thereby increasing the precision of the working operation, and further allows for the performance of simultaneous multiple working operations on the elongated object with the working tool holders in close proximity to each other and the elongated object.

Other objects and features of the present invention will be apparent from the following detailed description considered in conjunction with the accompanying drawings. It is to be understood however, that the specification and drawings are intended for the purposes of illustrating the preferred embodiments and not as a definition of the limits of the invention, for which reference should be made to the appended claims.

DETAILED DESCRIPTION OF THE PREFERRED EMBODIMENT

Figure 1:
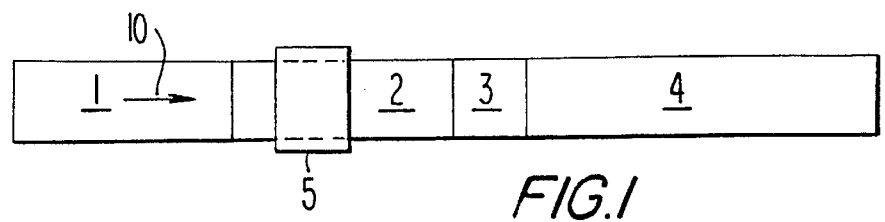
FIG. 1 shows a means according to the preferred embodiment of the invention with sections for feeding in, working, feeding-out and for cutting the worked profile or elongated object.

In the currently preferred embodiment of the present invention, FIG. 1 shows an apparatus for working of elongated objects made of, for example, wood, plastic or metal profiles, comprising a feeding in section 1, a working section 2 and a feeding-out section 4. The apparatus also comprises a cutting section 3 for cutting of worked objects which may be disposed between working section 2 and feeding-out section 4. There are also arrangements for linear movement of the objects from the feeding in section 1 through the working means along the path in the direction of arrow 10 in FIG. 1, and through the cutting section to, and through, the feeding out section. The means is also equipped with clamps for clamping the objects during working and which form no part of the claimed invention.

Figure 2:
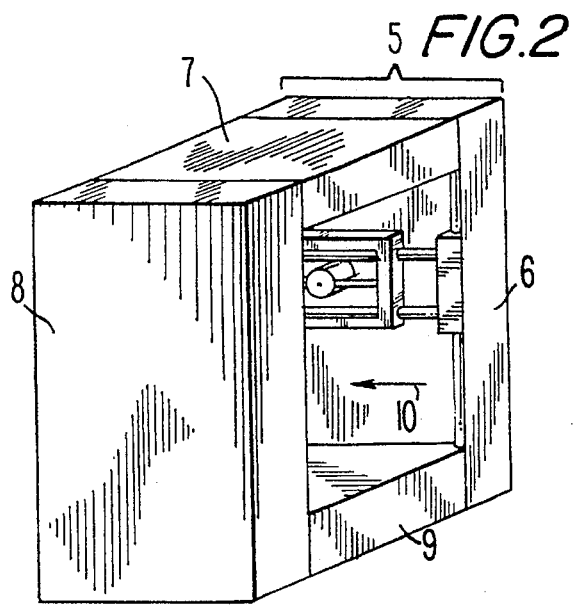
FIG. 2 shows the working section in the means of FIG. 1.

FIG. 2 shows the working unit 5, an interconnected polygonal frame array, preferably comprised of four work units or modules. As preferred, the array is configured as a rectangle and each side of the polygon includes a separate module, each separate module being shown by designations 6, 7, 8 and 9. An elongated object to be worked is moved through the open portion of the working units along a path in the direction of arrow 10. In each of the separate frame array sides 6, 7, 8 and 9 there are mounted means for holding a working tool.

Figure 3:
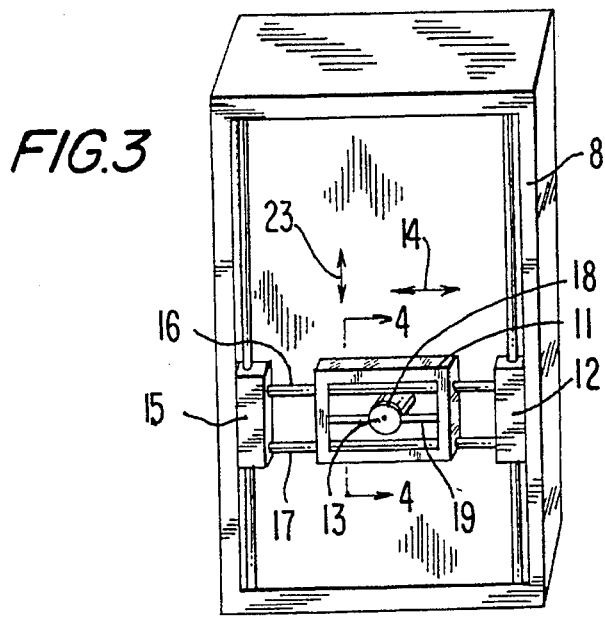
FIG. 3 shows one of the work units of the working section taken at 3—3.

In accordance with an illustrative embodiment of the present invention the four outer frames 6, 7, 8 and 9 are, in principle, made in the same way. FIG. 3, for example, shows vertically positioned frame array side 8. In this frame there is a module containing a driving motor 18, on the axis of which driving motor is a tool holder 21, into which a tool 22 for the working of the elongated object can be mounted. The motor 18 is movably mounted in a holder or frame 11. The holder or frame 11 is movable in the direction indicated by the arrow 14 by gliding on guideways 16, 17. The guideways are mounted in or to holders 12, 15 which themselves are movably mounted in the outer frame 8 for movement of holders 12, 15 in a direction perpendicular to guideways 16 and 17, as shown by arrow 23.

Figure 4:
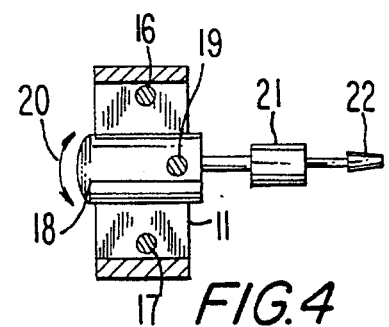
FIG. 4 shows a section along the line 4—4 of a part of the working section of FIG. 3.

The mounting of the motor 18 is shown in greater detail in FIG. 4 which is a cross section along the line 4—4 of FIG. 3. The motor 18 is pivotally mounted on the holder 11 by means of shaft 19. As a result, the motor can also be pivoted about the shaft as shown by the arrow 20 which results in the tool holder 21 being moveable to an inclined setting relative to the worked object.

The means which are required in order to achieve the movements described above and to keep or lock the various parts in certain positions are known in the art and therefore for the sake of clarity, are not shown in the figures. In order to achieve sufficient precision, servo motors in conjunction with threaded shafts, for example, can be used for moving the tool holders or frames. The clamps for holding the worked goods can be controlled e.g. by air pressure cylinders.

As can be seen from the above description, the working tool can move in three directions, i.e. with three essential degrees of freedom, one movement being at a right angle to the direction of movement of the worked object and movements in two directions which are at right angles to each other and in a plane which is parallel to the direction of movement of the object. Also, a fourth degree of freedom is obtained in that the driving motor for the tool is mounted on a shaft and thus is movable for inclination of the tool holder relative to the elongated object to be worked. A fifth degree of freedom is also possible, mainly by a movement around the shaft 19 at right angle to shaft 19 in a plane parallel to the direction of movement of the worked object. Other embodiments of the invention can be that the four frames included in a working unit are positioned in a different way relative to each other. It is, however, essential that working using several tools can be performed within a small area and with each tool holder being respectively moveable with several degrees of freedom. In this way, several steps of the work can be performed at the same time thereby reducing the time for the whole working job.

By concentrating the tools within a short distance i.e. in close proximity to each other, the distance between the clamps, which are situated before and after the position where the working is done, is reduced while the precision is increased. This also makes it possible to work with a high tool speed, for example, spindle speeds of up to 60,000 rpm can be used with drills and cutting mills having an outer diameter of up to 8 mm. Working with high tool speeds is facilitated by the use of a special grade of oil for cutting edges and drill tips. This grade of oil consists of 100 percent organic lubricant and contains no water. The cutting oil therefore has little cooling effect and its sole function is to reduce friction between the worked object and the cutting edge and to eliminate adhesion of milling chips from the worked object onto the tool.

In order to achieve a faster movement of the clamps which are used for clamping the objects, the clamps can be made with one fixed and one movable shoe, whereby the movable shoe is mounted onto a cylinder, the opposite end of which is mounted onto a further cylinder in order to achieve a two-step movement of the clamp.

Thus, while fundamental novel features of the present invention have been shown, described and pointed out, as applied to the preferred embodiments thereof, it will be understood that various omissions, substitutions or changes in the form and details of the disclosed invention may be made by those skilled in the art without departing from the spirit of the invention. Therefore, the invention is intended to be limited by the scope of the claims appended hereto.

We claim:

1. An apparatus for working an object with at least one working tool, comprising:

a feeding-in section;

a feeding-out section;

a moving arrangement for moving the object along a path from the feeding-in section to the feeding out section;

a working section operably located between the feeding-in section and feeding-out section, comprising;

a) a polygonal frame array having an open central portion, the path of the object passing through said open portion of said frame array;

i) a first side of said frame array comprising a first module including:

a first means for holding a working tool, a first connecting means for movably connecting said first working tool holding means to said first side of said frame array and operable for selectively moving said first working tool holding means relative to said first side of said frame array in a first direction substantially parallel to said path, in a second direction substantially perpendicular to said path, and in a third direction comprising an arc defined radially about an axis defined substantially parallel to said path so as to selectively move a working tool held by said first holding means in one or a concurrent plurality of said first, second and third directions for working an object;

ii) a second side of said frame array comprising a second module including:

a second means for holding a working tool, a second connecting means for movably connecting said second working tool holding means to said second side of said frame array and operable for selectively moving said second working tool holding means relative to said second side of said frame array in said first direction substantially parallel to said path, in said second direction substantially perpendicular to said path, and in said third direction comprising an arc defined radially about an axis defined substantially parallel to said path so as to selectively move a working tool held by said second holding means in one or a concurrent plurality of said first, second and third directions for working an object;

said first working tool holding means and said second working tool holding means being operably independently moveable for moving their respective working tool holding means into close proximity relative to each other and to the object.

2. The apparatus of claim 1, wherein the number of sides of said polygonal frame array is four.

3. The apparatus of claim 2, wherein said first working tool holding means is linearly bidirectionally moveable in said first and second directions relative to said first frame array side.

4. The apparatus of claim 3, wherein said first connecting means includes:

means for moving said first working tool holding means in said first and second directions relative to said first frame array side, and means for moving said first working tool holding means in said third direction which is arcuate relative to the object.

5. The apparatus of claim 1, wherein said frame array comprises several separate frames, one for each side of said polygon, and means for connecting the respective adjacent sides of said frames to one another.

6. The apparatus of claim 5, wherein said number of separate frames is four and the polygon is a rectangle.

7. The apparatus of claim 6, wherein said said first working tool holding means is linearly bidirectionally moveable in said first and second directions relative to said first separate frame.

8. The apparatus of claim 7, wherein wherein said first connecting means includes:

means for moving said first working tool holding means in said first and second directions relative to said first separate frame and in said third direction which is arcuate relative to the object.

9. The apparatus of claim 7, wherein said first direction of said first working tool holding means is at a right angle to the path of movement of the object, and said second direction and said third direction are at right angles to each other and define a plane parallel to the path of movement of the object.

10. The apparatus of claim 8, wherein said arcuate third direction lies in a plane perpendicular to the path of movement of the object.

* * * * *